United States Patent
Gutzeit

(10) Patent No.: US 12,363,058 B2
(45) Date of Patent: *Jul. 15, 2025

(54) MESSAGE CAPTURE IN A MULTI CHANNEL COMMUNICATION ENVIRONMENT

(71) Applicant: LeapXpert Limited, Causeway Bay (HK)

(72) Inventor: Dmitry Gutzeit, Causeway Bay (HK)

(73) Assignee: LeapXpert Limited, Causeway Bay (HK)

( * ) Notice: Subject to any disclaimer, the term of this patent is extended or adjusted under 35 U.S.C. 154(b) by 99 days.

This patent is subject to a terminal disclaimer.

(21) Appl. No.: 18/220,998

(22) Filed: Jul. 12, 2023

(65) Prior Publication Data

US 2023/0353522 A1    Nov. 2, 2023

Related U.S. Application Data

(63) Continuation of application No. 17/714,758, filed on Apr. 6, 2022, now Pat. No. 11,743,218.

(30) Foreign Application Priority Data

Dec. 21, 2021    (HK) ............................ 32021045048.4

(51) Int. Cl.
    *H04L 51/21*    (2022.01)
    *H04L 51/046*    (2022.01)
(52) U.S. Cl.
    CPC ............ *H04L 51/21* (2022.05); *H04L 51/046* (2013.01)

(58) Field of Classification Search
    CPC ....... H04L 51/21; H04L 51/046; H04L 51/56; H04L 51/066; H04L 67/565; H04L 63/308
    See application file for complete search history.

(56) References Cited

U.S. PATENT DOCUMENTS 10,057,537 B1 * 8/2018 MacDonald-King ........................ H04N 21/43074
2014/0304343 A1 * 10/2014 Skiba .................... H04L 51/046 709/206

(Continued)

FOREIGN PATENT DOCUMENTS

WO    WO-2015017886 A1 *    2/2015    ....... G06F 17/30165

*Primary Examiner* — Austin J Moreau
(74) *Attorney, Agent, or Firm* — MORRISON & FOERSTER LLP

(57) ABSTRACT

There is provided a method, system and computer readable medium for capturing electronic messages to specified addresses within an entity originating from external of the entity. An integration module may be associated with a corresponding electronic messaging channel for receiving messages; including a first set of attributes conforming to one or more predetermined protocols of an electronic messaging channel. The integration module upon receipt of one or messages to specified address within the entity, generates one or more corresponding messages according to a common communication protocol for messaging within the entity which is different from the one or more predetermined protocols. The one or more corresponding messages include at least some attributes of said first set of attributes which are unsupported by said common communication protocol in an associated data structure; which is stored at a data store.

20 Claims, 3 Drawing Sheets

(56) References Cited

U.S. PATENT DOCUMENTS

| | | | |
|---|---|---|---|
| 2015/0081569 A1* | 3/2015 | Moore | H04W 4/21 |
| | | | 709/204 |
| 2015/0097701 A1* | 4/2015 | Al-Ali | A61M 16/0051 |
| | | | 340/870.07 |
| 2015/0199422 A1* | 7/2015 | Gaydaenko | G06F 40/151 |
| | | | 707/754 |
| 2017/0124038 A1* | 5/2017 | Upadhyay | G06F 40/166 |
| 2018/0097756 A1* | 4/2018 | Lew | G06Q 30/01 |
| 2021/0058361 A1* | 2/2021 | Belling | H04L 51/216 |
| 2022/0030391 A1* | 1/2022 | Lu | H04L 27/2613 |

* cited by examiner

MESSAGE CAPTURE IN A MULTI CHANNEL COMMUNICATION ENVIRONMENT

CROSS REFERENCE TO RELATED APPLICATIONS

The present application is a continuation of U.S. application Ser. No. 17/714,758, filed Apr. 6, 2022, entitled "MESSAGE CAPTURE IN A MULTI CHANNEL COMMUNICATION ENVIRONMENT," which claims the benefit of Hong Kong Application No. 32021045048.4, filed on Dec. 21, 2021, the contents of which are incorporated by reference herein in their entirety for all purposes.

FIELD OF THE DISCLOSURE

The present disclosure relates to a system and method for capturing communications between addresses within an entity and third parties external of the entity via multiple different electronic messaging applications.

BACKGROUND OF THE DISCLOSURE

Communication of information has rapidly developed from voice calls between two individuals which were connected via a human operator establishing a dedicated telephone circuit; to an ever increasing number messaging applications which can communicate text, emoticons, images and other information between individuals, potentially wirelessly, instantaneously and across countries and around the world.

It would be appreciated that the ever increasing range of messaging services on various platforms which are available means that a business has multiple channels by which accounts operated by employees are communicating with customers of the business, either via dedicated conversations (one-to-one) or in certain group interactions (one-to-many) using these messaging services. Particularly in sensitive regulatory environments including legal, financial or government businesses/organisations, it is increasingly important for a company to be able to capture and monitor communication by employees across all channels for including compliance, record keeping and information security.

In addition, as the capacities and features of the messaging channels continue to evolve independently of each other, inevitably some capacities and features of one messaging channel are different from other messaging channel(s). However, over time; as a particular feature gains traction with users; this feature or capacity may be more broadly adopted amongst messaging channels.

Organisations are understandably reluctant to mandate a specific channel of communication to their customers; and wish to utilise existing messaging services to avoid their customers installing yet another messaging client on their device, which may be a desktop computer, laptop, portable electronic device such as a smartphone or tablet computer.

Therefore, particularly for the organisations in sensitive regulatory environments there is increasing pressure to capture employee interactions across multiple messaging channels, the nature, number and features of which are dynamically changing independently of each other. Accordingly, it is an object of the present disclosure to develop a system and method which addresses at least some of the above difficulties or provides a useful choice.

SUMMARY OF THE DISCLOSURE

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims.

In accordance with a first aspect of the present disclosure, there is provided a computer-implemented method for capturing electronic messages to specified addresses within an entity originating from external of the entity on a plurality of electronic messaging channels. The method may comprise executing instructions on one or more processors for:—associating at least one integration module with a corresponding electronic messaging channel for receiving messages thereon, said messages may include a first set of attributes conforming to one or more predetermined protocols of said electronic messaging channel; generating upon receipt of one or more messages to specified address within the entity, by the integration modules, one or more corresponding messages according to a common communication protocol for messaging within the entity which is different from the one or more predetermined protocols; storing at one or more data stores the corresponding messages generated according to said common communication protocol. The one or more corresponding messages may include at least some attributes of said first set of attributes which are unsupported by said common communication protocol in an associated data structure.

The method may further comprise recreating one or more messages received on one of the plurality of electronic messaging channels by a corresponding interface module, by retrieving corresponding one or more messages generated according to said common communication protocol from the one more data stores and extracting the values of the attributes unsupported by the common communication protocol from the associated data structure and any supported attributes from the message stored at said one or more data stores.

Recreating of said one or more messages may comprise specifying the values of the first set of attributes from supported attributes of the common communication protocol extracted from the stored message; and specifying the values of the attributes unsupported by the common communication protocol from the associated data structure extracted from the one or more stored messages retrieved from the one or more data stores.

Optionally, the data structure is a lightweight text data object. Optionally, the data structure is a Java Script Object Notation (JSON) object.

The computer-implemented method may further include modifying the common communication protocol for electronic messaging within an entity to include at least one or more previously unsupported attributes.

The computer-implemented method may further include inserting one or more indicia indicating the presence of unsupported attributes of said first set of attributes in the message generated according to the common communication protocol.

In accordance with a second aspect of the present disclosure, there is provided a computer-implemented method for capturing one or more electronic messages to a specified address within an entity from one or more parties external to the entity via one of a plurality of electronic messaging channels. The method may comprise executing instructions on one or more processors for: receiving at a first integration module said one or more messages to a specified address within an entity via a first electronic messaging channel; said messages including a first set of attributes in accordance with a first communication protocol for messages on said first electronic messaging channel; creating one or more corresponding messages to said specified address within the entity at the first integration module according to a common communication protocol for messaging within the entity which is different from the first communication protocol upon receiving one or more messages at the integration module; wherein the one or more corresponding messages may include at least some attributes of said first set of attributes of the message which are unsupported by said common communication protocol in an associated data structure from the one or more received messages; storing messages according to said common communication protocol at one or more data stores.

In accordance with a third aspect of the present disclosure, there is provided a computer system for capturing one or more electronic messages to a specified address within an entity from one or more parties external to the entity via one of a plurality of electronic messaging channels. The system may comprise:— a plurality of integration modules, wherein at least one or more integration modules are associated with a unique channel of a plurality of electronic messaging channels for receiving messages thereon, said messages may include respective sets of attributes according to a predetermined protocol of the electronic messaging channel upon which said message is transmitted; a central messaging module communicatively coupled to said plurality of integration modules for receiving messages generated by the integration modules, said central messaging module is configured such that upon receipt of one or more messages from one or more parties external of the entity, corresponding messages may generated by the integration module according to a common communication protocol and include at least some attributes of said respective set of attributes which are unsupported by said common communication protocol in an associated data structure; at least one or more data stores for storing messages generated according to said common communication protocol.

Upon receiving an instruction from an authorised user to recreate one or more messages received on the one or more integration modules of a specified communication channel of the plurality of communication channels, the central messaging module may retrieve corresponding one or more messages generated according to said common communication protocol from the one more data stores and may extract the attributes unsupported by the common communication protocol from the associated data structure and any supported attributes from the message stored at said one or more data stores for recreation of the one or messages.

The recreation of said one or more messages by said interface module may comprise specifying the values of the first set of attributes from supported attributes of the common communication protocol extracted from the stored message; and specifying the values of the attributes unsupported by the common communication protocol from the associated data structure extracted from the one or more stored messages retrieved from the one or more data stores.

Optionally, the generalised abstraction of the attributes unsupported by the common communication protocol may be a lightweight text data object.

Optionally, the generalised abstraction of the attributes unsupported by the common communication protocol may be a Java Script Object Notation (JSON) object.

In accordance with a fourth aspect of the present disclosure, there is provided a non-transitory computer-readable storage medium. The non-transitory computer-readable storage medium may store program instructions computer-executable by a processor of a computer to capture electronic messages to specified addresses within an entity originating from external of the entity on a plurality of electronic messaging channels by performing operations comprising: associating at least one integration module with a corresponding electronic messaging channel for receiving messages thereon; said messages including a first set of attributes conforming to one or more predetermined protocols of said electronic messaging channel; generating upon receipt of one or messages to specified address within the entity, by the integration modules, one or more corresponding messages according to a common communication protocol for messaging within the entity which is different from the one or more predetermined protocols; and storing at one or more data stores the messages generated according to said common communication protocol. The one or more corresponding messages may include at least some attributes of said first set of attributes which are unsupported by said common communication protocol in an associated data structure.

BRIEF DESCRIPTION OF THE FIGURES

In order to describe the manner in which the above-recited and other advantages and features of the disclosure can be obtained, a more particular description of the principles briefly described above will be rendered by reference to specific embodiments thereof which are illustrated in the appended Figures. Understanding that these Figures depict only exemplary embodiments of the disclosure and are not therefore to be considered to be limiting of its scope, the principles herein are described and explained with additional specificity and detail.

Preferred embodiments of the present disclosure will be explained in further detail below by way of examples and with reference to the accompanying Figures, in which:—

DETAILED DESCRIPTION OF THE PREFERRED EMBODIMENTS

Figure 1:
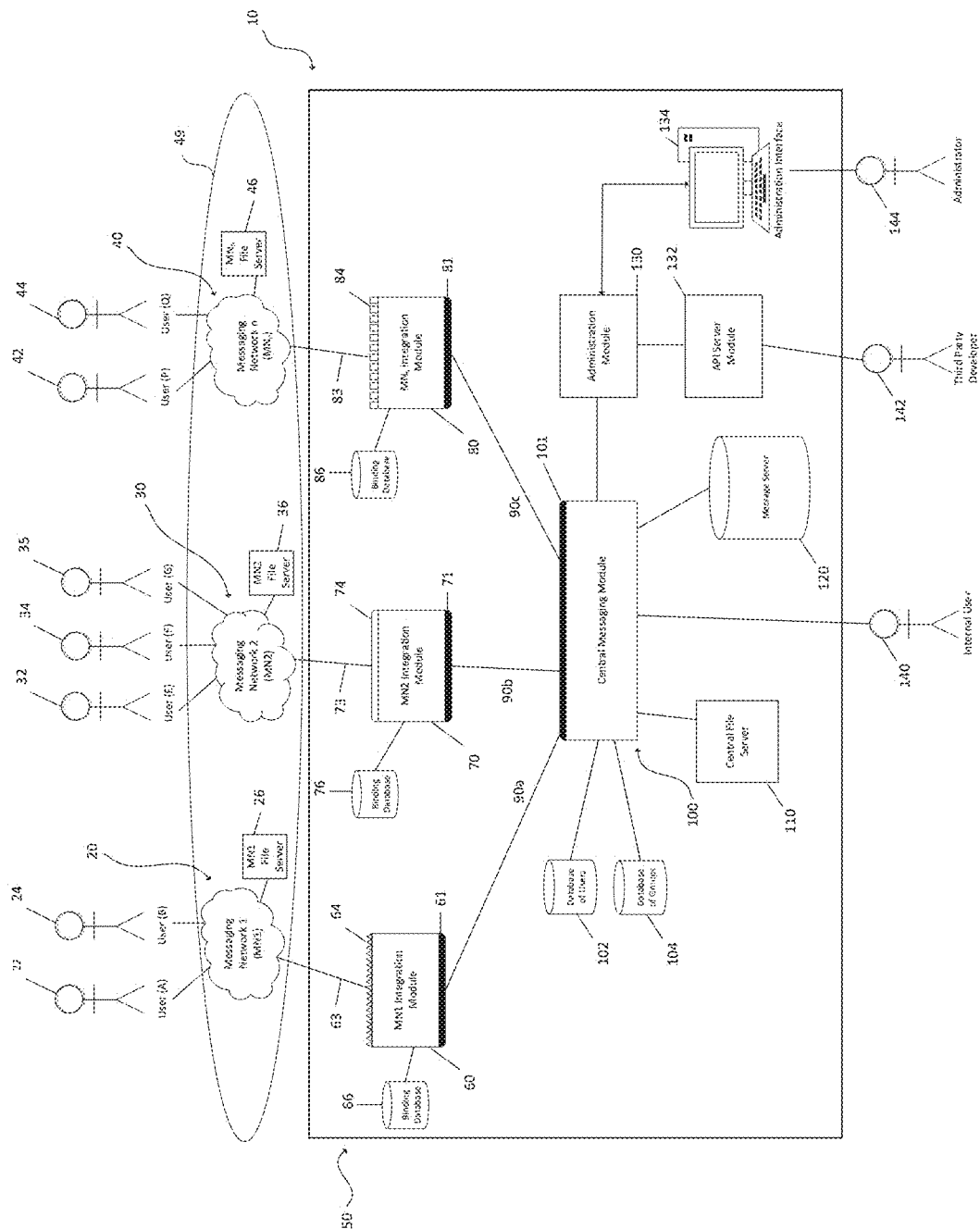
FIG. 1 depicts the schematic architecture of an embodiment of the system of the present disclosure.

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure.

The disclosed technology addresses the need in the art for providing an adaptable method of capturing attributes and values thereof for messages received over different messaging platforms. The disclosed method and system is flexible and can change and evolve as protocols of the different messaging platforms change and evolve; and additional attributes can be added as necessary to a common messaging protocol inside the entity or organisation receiving the messages.

In an embodiment of the present disclosure the communication channels may be user accounts on separate messaging applications, using a messaging client supported by a dedicated backend platform specific to the channel in question. The applications could be any one or more electronic messaging applications, including electronic messaging applications selected from the group comprising WeChat, WeCom, Federated Messaging Orchestration Platform (FMOP), WhatsApp, LINE, Telegram, Viber, iMessage, Facebook Messenger, RCS, Short Message Service, Kakao Talk or similar.

In the embodiment described, it would be appreciated that the various messaging applications are likely to have different user interfaces and are based upon different underlying software frameworks or platforms in accordance with established protocols that may be proprietary to that platform. Advantageously, the messaging applications may be operable on portable electronic devices such as smartphones or tablet computers as either native applications or web based applications; providing an interface to a user for receiving various types of input from the user via the hardware of the device.

As described herein in further detail, through the operation of the disclosed system a user having an account on a first messaging platform is able to participate in a chat with users having accounts on other messaging platforms, typically in a logical conversation stream between all members of the group. The transmission and reception of messages between members of a group constitutes a series of messages generated in a specific time sequence, and in order to maintain coherence and logic in such a conversation generally such messages are communicated and displayed in an appropriate order, which is usually although not exclusively time series based.

It would further be appreciated that the messages may contain items of additional content above and beyond text, including documents, music files, movie files, pictures, etc. which may be embedded or otherwise included in the transmitted message. In addition, the messages may include attributes such as animation, text formatting, location information, payment information or similar.

Alternatively, the message may contain identification of a file or a group of files that are stored on a remote data server accessible over a network. On receiving such a message an application may enable its user to download the file or files from the remote location. The message may, for example, include a uniform resource locator (URL) identifying the location at which the file or files are accessible over the internet. The file could be, for example, PDFs, MP3 files, audio files, video files, images etc.

It would be appreciated that these items of additional content in addition to basic text are attributes which may be specific to a one or more messaging platforms, and these attributes are in a constant state of evolution with changing user requirements and inspired by various features (and related attributes) which may have been developed on other messaging platforms. Features which are supported by attributes of messages used initially only on one platform often inspire similar or derivative features on other messaging platforms.

An exemplary tabular representation of the various features/attributes is depicted below.

| Attribute/Feature | WeCom | Telegram | Common Internal Communication Platform |
|---|---|---|---|
| Text Messages | Supported | Supported | Supported |
| File Sharing | Supported | Supported | Supported |
| Animated Stickers | Not Supported | Supported | Not Supported |
| Payment request | Supported | Not Supported | Not Supported |
| Location | Supported | Supported | Not Supported |

Referring to FIG. 1, there is depicted an exemplary communication system according to an embodiment of the present disclosure.

As depicted, user A 22 and user B 24 have accounts on a first electronic messaging network 20, which has a specific protocol or set of rules or procedures to which all messages transmitted on the platform are generally compliant with.

Optionally, the first messaging network may include a file server 26 on which files accessible to users of that network are stored. It would be appreciated that the same messaging client may be used by users A and B but may be operable on various types of terminal devices, including portable electronic devices or laptops or desktop computers. These devices would provide software applications which enable users to log in to their specific accounts on that messaging network and communicate messages to, from and between other users on the same messaging network as is known in the art. For the embodiment depicted; this messaging network 20 could be WhatsApp; although it would be appreciated that this is an arbitrary designation.

Referring to the second messaging network 30, user E 32, user F 34 and user G 35 each have unique messaging accounts on this messaging network which are accessible via applications operating on terminal devices such as portable electronic devices, laptops or desktop computer systems. Similarly, as with the first messaging network 20, a messaging file server 36 is associated with the second messaging network, providing the facility to store messages and files associated with or embedded with messages transmitted by, to and between users of messaging network 2. For the embodiment depicted; this messaging network could be WeChat; although it would be appreciated that this again merely an arbitrary designation. Again, messages transmitted on this messaging platform between users having accounts on that platform will be generally compliant with a WeChat protocol or set of rules or procedures.

Finally, user P 42, user Q 44 operate on messaging network 40 similarly operate their user accounts on messaging applications accessible on terminal devices which may include portable electronic devices, laptops or desktops. As with the first and second messaging networks, messaging network 40 may have an associated messaging network file server 46 by which files transmitted to and between members of that network may be stored. Similarly, messages transmitted on this messaging platform between users having accounts on that platform will be generally compliant with a protocol or set of rules or procedures; that is not necessarily the same as the protocol governing messages on first network (e.g. WhatsApp) 20 or the second network 30 (e.g. WeChat).

As depicted there is a system by which messages between each of the first 20 messaging network, second messaging network 30 and $N^{th}$ messaging networks 40 can be communicated by, to and between users of the respecting networks through the operation of the communication system 10.

Client applications for one communication channel or messaging network may be operable on various electronic devices (e.g. WhatsApp on a smartphone, tablet and laptop computer) in existing systems.

The messages transmitted from the internal user to the various users of the messaging platforms as well as the messages received from the users of the various messaging platforms may include pre-pended or appended user account details which are automatically sent and stripped and/or processed by the respective messaging networks prior to dissemination on the central or common messaging network.

In such a multi-channel communication method and system, communication is facilitated by the central messaging platform 50 which includes a first integration module 60 for integration between the first messaging network 20 and the central or common messaging module 100.

Similarly, a second network integration module 70 provides an interface between the second messaging network 30 and the central messaging module 100. Finally, a $N^{th}$ integration module 80 is depicted for providing integration between the central messaging module 100 and the $N^{th}$ messaging network 40.

Additionally, and including an exemplary schema as depicted below in Table 1, binding databases 66 for the first messaging network 76 for the second messaging network and 86 for the $N^{th}$ messaging network are associated with the various integration modules. These binding databases store an association between the messaging network account identifier of the various user accounts on the various user messaging network with a user ID on the central messaging platform. It would be appreciated that the term "database" refers to the function performed by the respective binding databases 66, 76 and 86 rather than the physical manifestation thereof. As such, the "database" may refer to a logical database defining the logical structure and relationship between the above associations and may be stored across various pieces of hardware including one or more service. Alternatively, the term "database" may also refer to storage of database in an unstructured form, again one or more physical pieces of hardware such as one or more service.

It would be appreciated that the various integration modules 60, 70, 80 include a database management system for facilitating the corresponding database analysing and obtaining results obtained. This database management system may be part of the integration module or may be executed on dedicated hardware.

Each of the respective integration module 60, 70, 80 have interfaces 64, 74, 84 which translate commands and messages to/from the central messaging network and the messaging network with which they are in communication. Again, messages transmitted on the central messaging platform between users having accounts on that platform will be generally compliant with a protocol or set of rules or procedures.

It would be appreciated that these interfaces may be communicatively coupled to the messaging network across links 63, 73, 83 via standard wired or wireless network communications to transmit messages in a common format thereon.

External Interfaces 64, 74, 84 provide implementations of the API exposed by the messaging networks for the specific networks. For example, the interface 64 could be configured to provide commands and appropriate variables according to the WhatsApp API; whereas interface 74 issues commands and variables in a format compliant with the WeChat API etc.

Similarly, the various integration modules 60, 70, 80 have corresponding interfaces 61, 71, 81 for interacting with an interface 101 of the central messaging module 100. It would be appreciated that these interfaces generate messages compliant with a consistent protocol across each of the various integration modules, as represented by the common interfaces 61, 71, 81.

Messages may be passed to and from interface 101 of the central messaging module 100 and are the means by which standard messaging commands and attributes of the messages are transmitted from the central messaging module 100 to the corresponding integration module.

Also, in communication with the central messaging module 100 is a database of users 102 and a database of groups 104. A central messaging module 100 may also be in communication with a central file server 110. It would be appreciated that this central file server 110 may be connected to a data store to store messages, as well as the associated files transmitted to, from and between participants in the conversations facilitated by the messaging platform of the present disclosure.

The central messaging module 100 may also be communicatively coupled with a message server 120 on which the messages transmitted to, from and between the user accounts on the platform may be stored for audit purposes.

Finally, the central messaging module 100 may be communicatively coupled with an administration module 130 which in turn is coupled to an application programming interface server module 132 by which third party developers 142 may interact with those central messaging module 100. Similarly, the administration module 130 is in communication with an administration interface 134 by which an administrator 144 may look after administrative functions of the central messaging platform.

These administrative functions may include but are not limited to creation, addition, modification of user profiles on the central messaging module; management of the association of users for the integration modules to handle communication with messaging networks and management and administration of groups and administration of groups. From time to time; protocols of the messaging networks 20, 30 and 40 change and evolve to include new attributes and commands; and corresponding changes may or may not be made to the protocol for messages exchanged on the internal network 90.

Daily operations of the central messaging platform 50 may be performed by an internal user 140 operating an application using standard hardware such as a keyboard mouse, touchscreen etc.

Figure 2A:
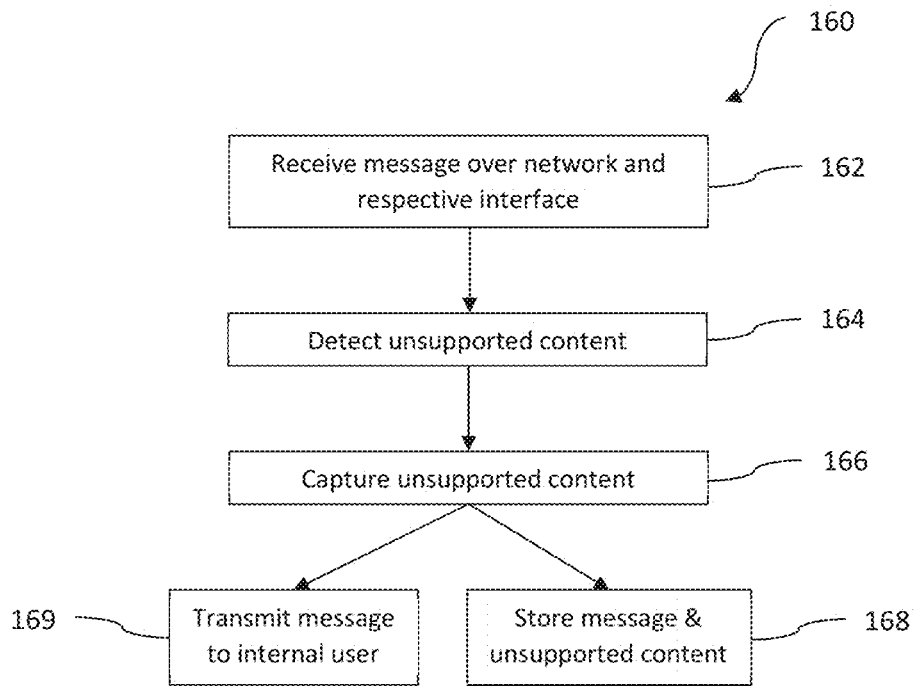
FIG. 2A depicts an exemplary flow chart of the proposed steps in the method for capturing the attributes of an unsupported message.

According to an embodiment of the present disclosure, as depicted with reference to FIG. 2A, an electronic message (which has attributes (typically name/value pairs) in accordance with a relevant communication protocol (e.g. WhatsApp) is received at the relevant interface module of the communication network is processed according to the exemplary steps 160.

The message is received at the relevant interface in Step 162, and the presence of unsupported content in that message relative to the common communication protocol of the central messaging platform is detected in Step 164. The unsupported content is captured in a data structure in Step 166; with this content stored together with the message which is created with the supported attributes in accordance with the common communication protocol in one or more data stores in Step 168. The message with the supported attributes is then transmitted to the internal user in Step 169. Optionally, this message may include indicia indicating the presence of unsupported content.

It would be appreciated that in this way, all attributes (and where relevant, specific values for the attributes) are thereby included in an electronic message received at a relevant interface module, including attributes which are not able to be mapped onto a corresponding attribute in compliance with the common central messaging platform protocol. Importantly, instead of discarding this information, the information is captured and stored in the newly produced message.

Optionally, this information may be recorded in a new custom attribute generically entitled "unsupported event"; and able to capture meta data describing the attribute and a payload.

Advantageously, the payload may be a lightweight text based open standard design, such as a JSON object or similar.

Figure 2B:
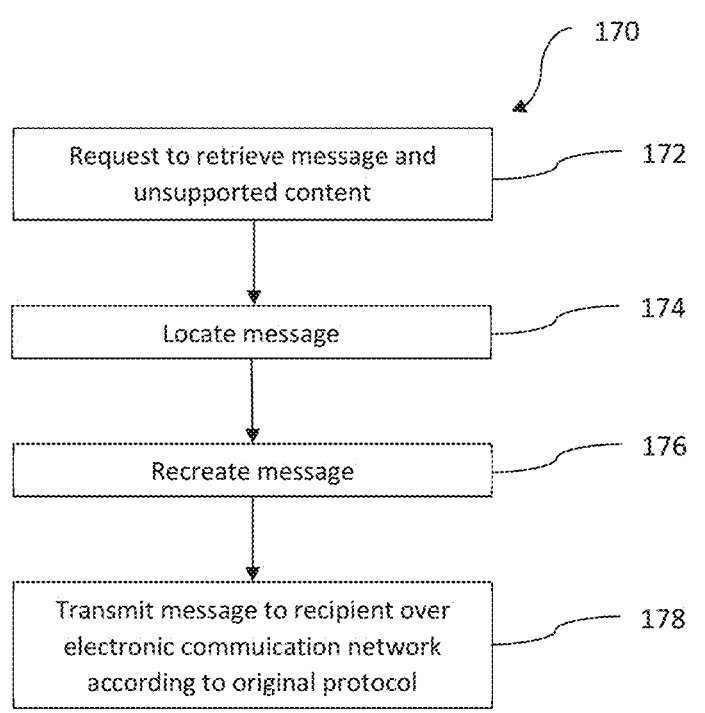
FIG. 2B depicts an exemplary flow chart of the proposed steps in the method for recreating a message from a data store.

As depicted in the steps 170 detailed in FIG. 2B, if it is necessary to regenerate the original message from the message created by the relevant interface (e.g. at the interface module) a number of steps may be performed. Upon receiving a request from an authorised user (Step 172), and the relevant electronic message (s) are located in the data store (Step 174) by message ID or similar.

The values of the unsupported attributes could be retrieved from message stored in the data store, and extracted from the data structure and inserted by the interface module into the generated message in Step 176.

This recreated message may then be transmitted to the authorised user; with the content and attributes according to the electronic messaging protocol consistent with the original message which was received in Step 178.

The event which triggers the need for regenerating the messages may arise from a variety of business requirements. These may include suspected employee malfeasance, random audits, compliance audits, performance audits or similar. Under these circumstances, once a verified authorised operator is granted access, they are able to review the entire stream of messages received by various communication channels to a specific address within the entity according to a predetermined time frame (e.g. a day, a week, a month etc). Thus, irrespective of the channel that the message arrived on; the message can be regenerated with all information present, including information that was unsupported by the common communication protocol at the time when the message was captured.

Another situation may arise where the message is regenerated from the data store, where an employee of the entity accesses messages sent by one electronic messaging channel to their address within an entity, using their portable electronic device or computer, and they wish to respond (and are authorised to do so) on the same electronic messaging channel, the message may be regenerated in full, with all of the information of the original message received on the electronic messaging platform (e.g. Telegram). Alternatively, where the employee is responding to the message using messages according to the common communication protocol within the entity, an indicia marking the unsupported content may be included; together with information about the unsupported content retrieved from the data store. In either situation; all data about the response message is also captured and stored by the messaging system of the present disclosure.

In this way, despite the common communication protocol not supporting the specific attribute of a message sent across a particular messaging platform; the fullness of the information of the original message is preserved as far as possible. It would be appreciated that this is essential for compliance purposes. Inevitably the common communication protocol will be outdated relative to the rapidly evolving features of disparate electronic messaging systems, which are likely to be independently operated and having constantly changing features associated therewith. The naming convention that is used by the respective interfaces in naming attributes which are unsupported by the protocol for messages on the internal messaging network is adaptable; and may be generated by the corresponding interface in accordance with predetermined rules. It would be appreciated that it is important that the names and values of unsupported attributes are captured systematically in order to provide the full information about the message, which may need to be recreated in due course; or in responding to the message.

For example the code below may be used to represent various attributes (and associated values) for a sample "payment request" message that may be transmitted between users on the WeChat/WeCom framework. This sample message may be received at the WeCom interface for an entity and addressed to a user having an account in the exemplary system depicted in FIG. 1.

The code of this message is depicted below.

```
"eventType": "com.leapxpert.wechat.payment.request",
"eventContent": {
    "sender": "joseph.lam@gmail.com",
    "receiver": "terry.wong@gmail.com",
    "sum": "HKD100",
    "expiration": "22.11.2022"
}
```

It would be appreciated that the messaging protocol for the WeChat platform includes details on how WeChat messaging clients handle information about the red pocket message. However, assume that at a particular point in time that the above message is received, the We Chat interface module of the system of FIG. 1 20 has no corresponding capacity in the interface module to map this particular WeChat event into the common internal messaging protocol version operational at that point in time. Such capacity may be included in a later release when the common internal messaging protocol is updated, if there is sufficient development time and the feature has sufficient use overall to justify development.

In accordance with the established internal messaging protocol, the message created by the WeChat interface module under these circumstances in accordance with the embodiment depicted and described with reference to FIG. 1 upon receiving a WeChat red packet may be represented and stored as shown below.

```
{
    "content": {
        "channel": "wechat",
        "original_event_type":"com.leapxpert.wechat.payment.request",
    "original_event_content": {
            "version": "1.222",
            "sender": "XXXX",
            "receiver": "XXXX",
            "sum": "100",
            "expiration": "12122021"
        },
        "msgtype": "l.unsupported-event"
    },
    "event_id": "$143273582556PhrSn:example.org",
    "origin_server_ts": 143273582987,
    "room_id": "!jEsUZKDJdhlrceRyVU:example.org",
    "sender": "@example:example.org",
    "type": "m.room.message",
}
```

This data structure is associated with the corresponding message created by the interface module; together with the supported attributes and associated values (e.g. text body and emoticons of the WeChat message) and the message is provided to the address of the user within the entity. Both the data structure of the unsupported content/event and the data about supported parameters of the message may be stored in the one or more data store(s) of the system.

Similarly, between clients on the Telegram messaging platform, an animated sticker attribute may be represented as follows.

```
"eventType": "com.leapxpert.telegram.animated.sticker","eventContent":
{
  "resolution": "640x360",
  "file": "picture1.gif",
  "duration": "30ms"
}
```

Once a message over Telegram having an animated sticker is received by the Telegram interface module (and that module at the time does not support this feature/event) the message created by the Telegram interface module for transmission and storage on the internal network may be represented as below:

```
    "content": {
        "channel": "telegram",
    "original_event_type": "com.leapxpert.telegram.animated.sticker",
    "original_event_content": {
            "resolution": "640x360",
            "file": " picture1.gif ",
            "duration": "30ms "
        },
        "msgtype": "l.unsupported-event"
    },
    "event_id": "$143273582443PhrSn:example.org",
    "room_id": "!jEsUZKDJdhlrceRyVU:example.org",
    "sender": "@example:example.org",
    "type": "m.room.message",
```

It would be appreciated that as additional functionality and attributes are added to the common communication protocol, the corresponding attributes and values of messages transmitted on the various electronic messaging channels may be represented directly in the generated messages as the common communication protocol evolves. It would be appreciated that this facilitates maintenance of the framework overall, and provides a complete record.

Figure 3A:
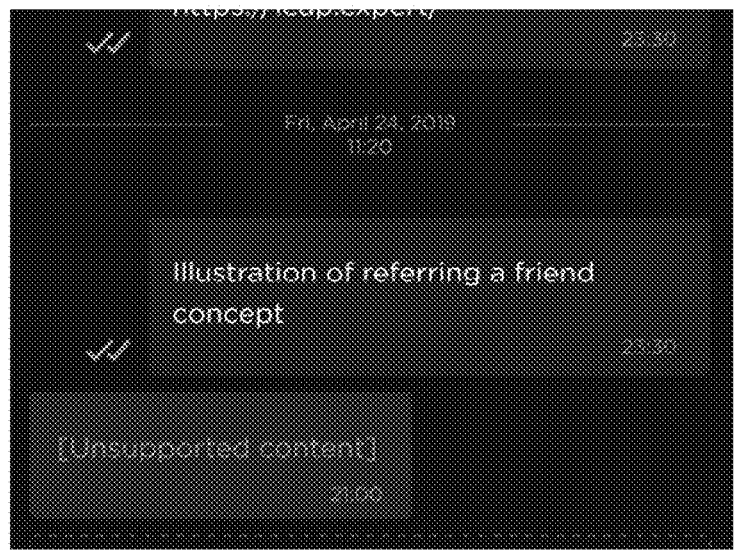
FIG. 3A depicts an exemplary view of a message generated according to a common communication protocol including an unsupported feature.

FIG. 3A depicts an actual screenshot of an embodiment of the method and system of the present disclosure. As depicted, the message stream 110 is between a user external of an entity which has sent a "referring a friend link" using their preferred electronic messaging application. The user's screen depicted shows the corresponding message generated in accordance with the internal communication protocol within the entity which includes the indicia "[Unsupported Content] 112 indicating that there is additional features/events accompanying the message which are not supported.

Figure 3B:
FIG. 3B depicts an exemplary view of the underlying fields of a data structure for the unsupported feature in the message depicted in FIG. 3A.

FIG. 3B depicts the actual data structure underlying the unsupported content which is stored in one or more data stores; together with the set of attributes which are supported. In this case, there are number of fields of name/value pairs for various attributes which are not supported. Based on these attributes; and the attributes which are supported by the common communication protocol the message can be regenerated as and when required; or following any update to the common communication protocol.

The above embodiments are described by way of example only. Many variations are possible without departing from the scope of the disclosure as defined in the appended claims.

In most prior art systems, some attributes (and values thereof) which are received from external messaging applications which are not supported by the internal messaging protocols are simply ignored and are not captured. With the ever increasing number of messaging applications and constant changes to the features supported; it is very difficult for a developer of a compliance oriented internal messaging platform to maintain parity of information captured across all supported messaging applications.

Unfortunately, especially in a compliance setting; it is of critical importance to the services provided that as much information as possible is captured about both received and transmitted messages. It is especially important for the ability to regenerate the full content of a message; from the common internal format of the message which is stored.

The present disclosure teaches a way in which this objective can be achieved, by capturing attributes (and associated values) of messages that may not be supported at that point in time by the common internal messaging protocol. At a subsequent point in time, it is therefore possible to fully regenerate this message as the necessary information has been captured. This is extremely beneficial in a compliance environment.

For clarity of explanation, in some instances the present technology may be presented as including individual functional blocks including functional blocks comprising devices, device components, steps or routines in a method embodied in software, or combinations of hardware and software.

It will be appreciated that all processes, servers, managers, agents, and modules described herein and other sessions, processes, steps or functions in embodiments may be implemented using known programming techniques, languages and algorithms, such as Java, C++, and others. Although the processes, services and modules described are implemented in applications on devices, it will be appreciated that some functions of the processes may be provided in a separate server that is in communication with networks 20 on platform 50. The titles of processes and platforms are provided as a convenience to provide labels and assign functions to certain processes. It is not required that a process perform only its functions as described above. As such, specific functionalities for each application or process may be moved between processes or separated into different processes. Processes may be contained within other processes. Different signalling techniques may be used to communicate information between applications using known programming techniques. Known data storage, access and update algorithms allow data to be shared between applications. It will further be appreciated that other applications and systems may be executing concurrently with other processes. As such, any of modules (or parts thereof) may be structured to operate in as a "background" application, using programming techniques known in the art.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial Bus (USB) devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

It will be appreciated that the embodiments relating to clients, servers, services, state machines and systems may be implemented in a combination of electronic hardware, firmware and software. The firmware and software may be implemented as a series of processes, applications and/or modules that provide the functionalities described herein. The algorithms and processes described herein may be executed in different order(s). Interrupt routines may be used. Data may be stored in volatile and non-volatile devices described herein and may be updated by the hardware, firmware and/or software.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method for capturing electronic messages to specified addresses within an entity and originating from external of the entity, comprising:
   receiving an electronic message originating from the external of the entity on an electronic messaging channel, the electronic message including a set of attributes conforming to one or more predetermined protocols of the electronic messaging channel;
   extracting unsupported attributes of a common communication protocol from the set of attributes of the electronic message, wherein the common communication protocol is for messaging within the entity and is different from the one or more predetermined protocols;
   generating one or more corresponding messages with supported attributes of the common communication protocol from the set of attributes, wherein the one or more corresponding messages comprise a data structure comprising the unsupported attributes; and
   storing, at one or more data stores, the one or more corresponding messages for an audit, compliance, or a combination thereof.

2. The computer-implemented method of claim 1, further comprising:
   recreating the electronic message by retrieving the one or more corresponding messages from the one or more data stores and extracting values of the unsupported attributes from the data structure and the supported attributes from the one or more corresponding messages.

3. The computer-implemented method of claim 2, wherein recreating the electronic message comprises:
   specifying the values of the supported attributes of the common communication protocol extracted from the one or more corresponding messages; and
   specifying the values of the unsupported attributes extracted from the data structure retrieved from the one or more data stores.

4. The computer-implemented method of claim 1, wherein the data structure is a lightweight text data object.

5. The computer-implemented method of claim 1, wherein the data structure is a JavaScript Object Notation (JSON) object.

6. The computer-implemented method of claim 1, further comprising modifying the common communication protocol to support one or more previously unsupported attributes.

7. The computer-implemented method of claim 1, further comprising inserting one or more indicia indicating a presence of the unsupported attributes in the one or more corresponding messages.

8. The computer-implemented method of claim 1, further comprising generating new attributes from the unsupported attributes for the one or more corresponding messages.

9. A computer system for capturing electronic messages to specified addresses within an entity and originating from external of the entity, the system comprising:
   a central messaging module configured to:
      receive an electronic message originating from the external of the entity on an electronic messaging channel, the electronic message including a set of attributes conforming to one or more predetermined protocols of the electronic messaging channel;
      extract unsupported attributes of a common communication protocol from the set of attributes of the electronic message, wherein the common communication protocol is for messaging within the entity and is different from the one or more predetermined protocols;
      generate one or more corresponding messages with supported attributes of the common communication protocol from the set of attributes, wherein the one or more corresponding messages comprise a data structure comprising the unsupported attributes; and
   one or more data stores for storing the one or more corresponding messages and the data structure comprising the unsupported attributes, wherein the one or more corresponding messages are stored for an audit, compliance, or a combination thereof.

10. The computer system of claim 9, further comprising:
    an interface module configured to:
       receive an instruction from an authorized user to recreate the electronic message; and
       recreate the electronic message;

wherein the central messaging module is further configured to:
    retrieve the one or more corresponding messages from the one or more data stores, and
    extract the unsupported attributes from the data structure and the supported attributes from the one or more corresponding messages.

11. The computer system of claim 10, wherein recreating the electronic message by the interface module comprises:
    specifying values of the supported attributes of the common communication protocol extracted from the one or more corresponding messages; and
    specifying values of the unsupported attributes extracted from the data structure from the one or more data stores.

12. The computer system of claim 9, wherein the data structure is a lightweight text data object.

13. The computer system of claim 9, wherein the data structure is a JavaScript Object Notation (JSON) object.

14. The computer system of claim 9, wherein the common communication protocol is modified to support one or more previously unsupported attributes.

15. The computer system of claim 9, wherein the central messaging module is further configured to insert one or more indicia indicating a presence of the unsupported attributes in the one or more corresponding messages.

16. The computer system of claim 9, wherein the central messaging module is further configured to generate new attributes from the unsupported attributes for the one or more corresponding messages.

17. A non-transitory computer-readable storage medium storing program code for capturing electronic messages to specified addresses within an entity and originating from external of the entity, which when executed by a processor causes a computing system to:
    receive an electronic message originating from the external of the entity on an electronic messaging channel, the electronic message including a set of attributes conforming to one or more predetermined protocols of the electronic messaging channel;
    extract unsupported attributes of a common communication protocol from the set of attributes of the electronic message, wherein the common communication protocol is for messaging within the entity and is different from the one or more predetermined protocols;
    generate one or more corresponding messages with supported attributes of the common communication protocol from the set of attributes, wherein the one or more corresponding messages comprise a data structure comprising the unsupported attributes; and
    store, at one or more data stores, the one or more corresponding messages for an audit, compliance, or a combination thereof.

18. The non-transitory computer-readable storage medium of claim 17, wherein the instructions when executed further cause the computing system to recreate the electronic message by retrieving the one or more corresponding messages from the one or more data stores and extracting values of the unsupported attributes from the data structure and the supported attributes from the one or more corresponding messages.

19. The non-transitory computer-readable storage medium of claim 18, wherein recreating the electronic message comprises:
    specifying the values of the supported attributes of the common communication protocol extracted from the one or more corresponding messages; and
    specifying the values of the unsupported attributes extracted from the data structure retrieved from the one or more data stores.

20. The non-transitory computer-readable storage medium of claim 17, wherein the instructions when executed further cause the computing system to generate new attributes from the unsupported attributes for the one or more corresponding messages.

* * * * *